3,074,132
BELT FASTENER
Milton B. Beach, Wheaton, Ill., assignor to Flexible Steel Lacing Company, Chicago, Ill., a corporation of Illinois
Filed Aug. 18, 1960, Ser. No. 50,478
5 Claims. (Cl. 24—33)

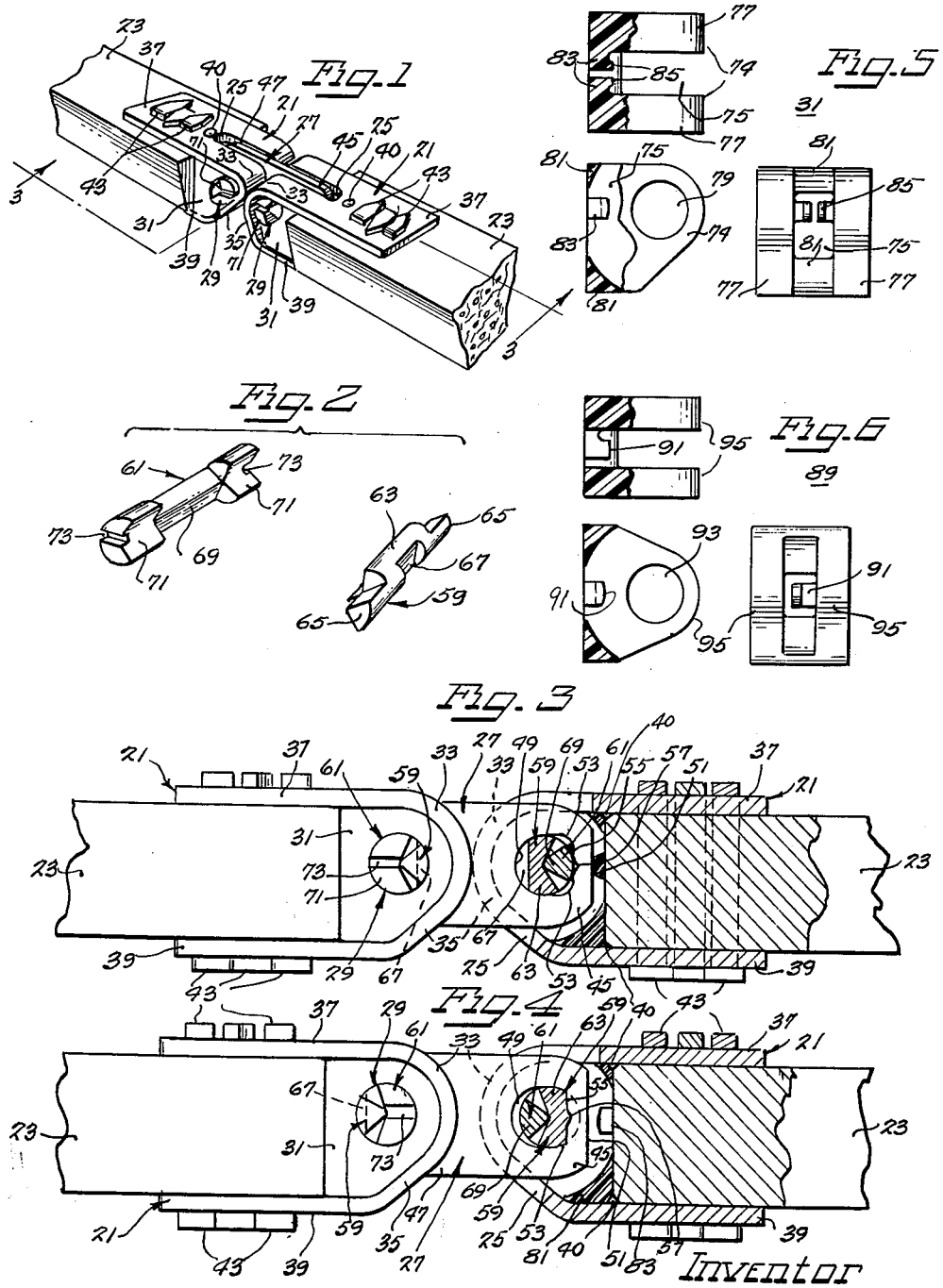

This invention relates generally to belt fasteners and, more particularly, to an improved arrangement or means for detachably connecting together the ends of various belts, such as conveyor belts or drive belts of various kinds including V belts.

The McComb patent, No. 2,851,753, issued September 16, 1958, illustrates one form of a very satisfactory arrangement for flexibly attaching the ends of a belt. In the arrangement shown in this patent, the bail-like attaching members are positionable in generally acute angular relation to each other so as to permit rotation of the hinge pin between a locked position retaining the various components and the belt ends in assembled relation to one another, and an unlocked position affording removal of the hinge pin and consequent disconnection of the belt ends. The construction disclosed herein provides an arrangement which makes unnecessary angular manipulation of the bail-like attaching members in order to afford connection and disconnection of the belt ends.

Accordingly, the primary object of the invention is to provide an improved means for detachably and flexibly connecting the ends of a belt. A further object of the invention is the provision of belt fastening means in a form which facilitates shipment in an assembled condition to avoid the danger of loss or misplacement of any of the components of the belt fastening means.

Other objects and advantages of the invention will become apparent by reference to the following description and the accompanying drawings in which:

FIGURE 1 is a perspective view of one embodiment of a belt fastening arrangement in accordance with the invention;

FIGURE 2 is a detailed perspective view of the elements which cooperate to form a hinge pin;

FIGURE 3 is an enlarged view taken along line 3—3 in FIGURE 1, the view being partially in section and showing the hinge pins in their unlocked position;

FIGURE 4 is a view similar to FIGURE 3, showing the hinge pins in their locked position;

FIGURE 5 is a mechanical drawing layout, partly in section, of the front, side, and top views of a bushing employed in the construction shown in FIGURES 1, 3, and 4; and FIGURE 6 is a mechanical drawing layout similar to FIGURE 5, showing a modified bushing construction in accordance with the invention.

The belt fastening means shown in FIGURES 1 through 5 of the drawings is particularly adapted for interconnecting V-type drive belts, and includes a pair of bail-like attaching members 21 which are shown attached to the ends of a belt 23. Each of the members 21 includes a slotted aperture or opening 25 for receiving one end of a connecting link 27. A pair of hinge pins 29 extend within the bights of the attaching members 21 and through the connecting link 27, and a pair of bushings 31 are located in the bights of the attaching members 21 and co-operate with the connecting link 27 and hinge pins 29 to retain the various components in assembled relation.

The attaching members 21, as seen in the drawings, are generally of similar shape, each including a central arched portion 33, an inclined leg 35, and a pair of parallel legs 37 and 39 adapted to respectively extend over the upper and lower faces of one end of the belt 23 and to be permanently attached thereto by a suitable number of cleats 43 or other suitable securing means. Each of the legs 37 and 39 also includes an inwardly directed nipple 40 which serves to properly maintain the bushings in place within the bights of the attaching members, regardless of the attachment of the members to the belt ends.

Each of the attaching members 21 also includes the before mentioned aperture 25 which constitutes an elongated slot having a width sufficient to admit the connecting link 27 to a position extending within the arched bight portion 33 and within adjoining portions of the legs 35 and 39, so as to permit free swinging movement of the connecting link 27 about the hinge pin 29.

The connecting link 27 constitutes an elongated strap or bar having opposed end portions 45 and 47 each including a generally circular bore or opening 49 and an end edge 51. Preferably, the corners of the connecting link 27 are rounded with a radius extending from the center of the opening 49 to prevent interference by the corners with free swinging movement of the connecting link within the bushings 31. The generally circular opening 49 in each end portion includes upper and lower lobes 53 adjacent the end edge 51. The lobes 53 impart to the opening an outer edge 55 which is generally parallel to the adjoining end edge 51 and which incorporates a centrally located, shallow concave edge portion 57 formed by the radius generally defining the opening. The configuration of the end edge 55 can be varied as desired so long as side faces of the link adjacent the edge 55 are capable of cooperating with the hinge pin in the manner to be described to prevent disassembly of the hinge pin 29 from the connecting link 27.

Each hinge pin 29 is generally cylindrical and in the illustrated construction, comprises the assembly of a pair of hinge pin elements 59 and 61 which, as shown in FIGURE 2, are generally similar in design to the hinge pin elements shown in the previously mentioned McComb patent. In this regard, the hinge pin elements each constitute a portion of a right circular cylinder, the hinge pin element 59 including a central portion 63 having a V-shaped recess along one side, and a pair of end portions 65, with each of the latter including a knife edge of V-shaped formation which is oppositely directed with respect to the V-shaped recessed portion 63. In the back of the hinge pin element 59 there is included a transverse notch or cut-out 67 which, as will be explained, cooperates with the outer edge 55 of one of the openings 49 in the connecting link 27 to retain the various components in assembled relationship.

The other hinge pin element 61 is somewhat longer than the hinge pin element 59 and includes a central knife edge portion 69 of V-shaped formation which has a length corresponding generally to the length of the central V-shaped recessed portion 63 in the hinge pin element 59, and which is received in the V-shaped recessed portion 63 of the hinge pin element 59 when the hinge pin elements are assembled to form the hinge pin 29. Outwardly of the central knife edge portion 69, the hinge pin element 61 includes two end portions 71 each of recessed V-shaped formation, oriented oppositely with respect to the central knife edge portion 69 for receiving the knife edge outer portion 65 of the hinge pin element 59. The outer end of each of the end portions 71 extends beyond the end portions 65 of the hinge pine element 59 and contains a transverse channel or notch 73 by means of which the hinge pin 29 formed by the elements 59 and 61 can be rotated with the aid of a screwdriver or other tool having a narrow end.

The knife edges and apices of the V-shaped recessed portions of the respective hinge pin elements are in alignment with one another and coincide with the axis of the generally cylindrical structure which results when the hinge pin elements 59 and 61 are assembled. The diameter of the resulting hinge pin 29 corresponds to the diameter of the generally circular openings 49 in the connecting link 27 so that the hinge pin will fit freely therethrough.

The bushings 31 are economically molded of plastic, such as nylon, but other materials and methods of fabrication could be used. Each bushing 31, as shown in FIGURE 5, includes a forward face 74 having therein a slot 75 which generally divides the bushing into a pair of half sections 77 and which is designed to freely receive one of the end portions 45 and 47 of the connecting link 27. Also included in each bushing 31 is a transverse bore 79 which passes through both half sections 77 and has a diameter corresponding to the diameter of the hinge pin 29 so that the hinge pin can be freely passed therethrough.

As previously noted, when the disclosed attaching means is operatively assembled, the bushings 31 are located within and substantially fill the bight of the attaching members 21. In this connection the forward face of the bushing 31 adjacent the attaching link 27 is rounded on a radius extending from the axis of the transverse bore 79 and is of such curvature as to smoothly bear against the inner surface of the arched portion 33 and inclined leg 35 of the attaching member 21. In the disclosed construction, the axis of the bushing bore 79 is in a plane located about one-third of the depth of the V-belt 23 from the top or wider face thereof. This locates the hinge pin, which, as will be seen, is assembled through the bore 79 in the bushing and the opening 49 in the connecting link 27, along the effective line of action in the belt. Of course, if other than a V-belt were employed, the formation of the attaching members 21 and the engaged face portion of the bushing 31 can be varied to locate the hinge pin axis in the plane of the effective line of action in the belt. If, for instance, the belt were rectangular in cross section, the legs of the attaching member could be interconnected by a semi-circular arched portion and the bushing formed with an accommodating engaging face, as is shown in FIGURE 6.

The half sections 77 of each bushing 31 are interconnected by bridge sections 81 which are located at the upper and lower margins of the end face adjacent the belt end. The inner surface of the bridge sections 81 are concavely formed on a radius preferably extending from the center of the bore 79 to provide maximum interconnection between the half sections, while permitting free swinging movement relative thereto of the rounded corners of the connecting link 27. The bridge sections 81 thus integrate and rigidify the construction of the bushing 31 so as to assure alignment of the bore 79 in each half section 77.

Locking of the connecting link 27 with the bushing 31 by the hinge pin 29 is facilitated by one or more resilient tabs or ears 83 which extend into the slot 75 from one or both the half sections 77 at a point between the bore 79 and the face of the bushing adjacent the belt end. More specifically, the bushing shown in FIGURE 5 includes an ear 83 extending from each of half sections 77, which ears are resiliently flexible with respect to movement radially of the axis of the boe 79, and are formed with a link engaging surface 85 located with respect to the axis of the bore so that when one of end portions 45 and 47 of the connecting link 27 is fully inserted within the slot 75 in the bushing 31, with the end edge 51 engaged with the surfaces 85 of the ears 83, the bore 79 and opening 49 are slightly misaligned, with the center of the opening 49 being displaced slightly toward the rounded forward face 74, as shown in FIGURE 3. In this position, the outer edge 55 of the opening 49 is visible within the bore 79 when the hinge pin 27 is not assembled therein, i.e., the outer edge 55 of the opening 49 extends somewhat into the bore 79. Preferably, the link engaging surface 85 of the ear 83 is of outwardly convex shape to reduce fatigue within the ear and avoid shearing of the ear during pivoting of the connecting link 27 relative to the bushing 31 as the belt passes around the pulleys or sheaves.

The resilient flexibility of the ear 83 permits distortion thereof and alignment of the bore 79 in the bushing 31 with the opening 49 in the connecting link 27 incident to insertion of the hinge pin therethrough when the longer hinge pin element 61 incorporating the end notch 73 is located adjacent the belt end, as seen in FIGURE 3. When thus assembled, the hinge pin is free to move axially and, thus, the components can be readily disassembled.

The connecting link 27 can be locked in the bushing 31 by inserting a screwdriver in to the end notch 73 and rotating the hinge pin 29 about 180 degrees. This action will, as seen in FIGURE 4, locate the hinge pin element 59 in adjacent relation to the belt end and will locate the transverse cutout 67 so that the outer edge 55 of the connecting link opening 49 will enter therein under the urging of the resilient ear 83. When thus positioned the ear 83 returns to its unflexed condition and the hinge pin 29 is prevented from moving axially by engagement of the sides of the cut-out 67 with the side faces of the connecting link 27 adjacent the outer edge 55 of the opening 49.

When desired, a screwdriver can be reinserted in the end notch 73 to reposition the hinge pin 29, as shown in FIGURE 3, with the hinge pin element 61 adjacent the belt end. This rotation of the hinge pin 29 causes the opening 49 in the connecting link 27 to be realigned with the bore 79 in the bushing 31, the ear 83 being flexibly displaced toward the belt end. As explained before, the hinge pin 29 is now free to move axially and can be removed from the connecting link 27 and bushing 31 to permit disassembly of these components and accompanying disconnection of the belt ends.

Although the description has thus far disclosed assembly of the connecting link 27 to a bushing 31 located in the bight of an attaching member 21 secured to one end of the belt, it is obvious that the same arrangement can be employed to assemble the other end of the connecting link 27 to the other end of the belt 23.

FIGURE 6 shows a modified bushing 89 in which a single ear 91 is employed rather than a pair of ears, as incorporated in the bushing 31 shown in FIGURE 5. In addition, the bushing 89 shown in FIGURE 6 is intended for use with a belt of generally rectangular cross section, as the center of the bore 93 shown therein is equidistant from the upper and lower faces of the bushing and the forward face of the bushing is semicircular for engagement with an attaching member having a complementary configuration.

With the disclosed construction, it is possible to assemble and disassemble a belt with facility when the belt is trained around a driving and driven sheave or pulley. This can be accomplished with the use of a simple tool, such as a screwdriver, and without requiring any particular manipulation of the belt itself, apart from bringing the ends into adjacent relation to each other. Moreover, the disclosed components can be assembled without connecting the ends of the belt so that a complete fastening unit can be shipped or stored without fear of loss or misplacement of any of the components.

Various of the features of the invention are set forth in the following claims.

What is claimed is:
1. In a device for connecting the ends of a belt which includes an attaching member of bail-like formation adapted to be secured to one of the ends of the belt and having an apertured bight, a connecting link adapted to be secured to the other end of the belt and having an end portion extending through the apertured bight of the attaching member, the end portion having an opening therein, and a hinge pin disposable transverse the bight and through the opening in the link end portion to pro- vide a detachable pivotal connection between the link end portion and the attaching member, the hinge pin having a groove in its outer surface and being positionable to engage the groove with the adjacent side face of the link end portion, the improvement comprising a bushing located within and engaging the bight of the attaching member and including a transverse bore for receiving the hinge pin therethrough, said bushing also including a slot for receiving the link end portion and being formed with resilient means in position relative to said slot to engage the end face of said link end portion and to urge the latter into a position providing misalignment of the link opening and said bore of said bushing, whereby the side faces of the link end portion engage the groove in the hinge pin and prevent shifting of the hinge pin transversely of the link.

2. In a device for connecting the ends of a belt which includes a pair of attaching members of bail-like formation, each adapted to be secured to one of the ends of the belt, the attaching members having an apertured bight, a connecting link having end portions extending through the apertured bights of the attaching members, the link end portions each having an opening therein, and a pair of hinge pins, one disposable transverse each bight and through the opening in the link end portion to provide a detachable pivotal connection between the link end portion and the attaching member, each hinge pin having a groove in its outer surface and being positionable to engage the groove with the adjacent side face of the link end portion, the improvement comprising a bushing located within and engaging the bight of each attaching member and including a transverse bore for receiving the hinge pin therethrough, each bushing also including a slot for receiving the link end portion and being formed with resilient means in position relative to said slot to engage the end face of said link end portion and to urge the latter into a position providing misalignment of the link opening and said bore of said bushing, whereby the side faces of the link end portion engage the groove in the hinge pin and prevent shifting of the hinge pin transversely of the link.

3. In a device for connecting the ends of a belt which includes an attaching member of bail-like formation adapted to be secured to one of the ends of the belt and having an apertured bight, a connecting link adapted to be secured to the other end of the belt and having an end portion extending through the apertured bight of the attaching member, the link end portion having an opening therein, and a hinge pin disposable transverse the bight and through the opening in the link end portion to provide a detachable pivotal connection between the link end portion and the attaching member, the hinge pin having a groove in its outer surface and being positionable to engage the groove with the adjacent side face of the link end portion, the improvement comprising a bushing located within and engaging the bight of the attaching member and including a transverse bore for receiving the hinge pin therethrough, said bushing also including a slot for receiving the link end portion and having a resilient ear in position relative to said slot to engage the end face of said link end portion and to urge the latter into a position providing misalignment of the link opening and said bore of said bushing, the link engaging surface of said ear being convex to permit longitudinal rocking movement of the link.

4. In a device for connecting the ends of a belt including an attaching member adapted to be secured to one of the ends of the belt, the attaching member including a bail-like portion with a longitudinally elongated aperture therein, a connecting link adapted to be secured to the other end of the belt and having an end portion extending through the aperture of the attaching member, the link end portion having an opening therein, and a hinge pin disposable transverse the attaching member and through the opening in the link end portion to provide a detachable pivotal connection between the link end portion and the attaching member, the hinge pin having a groove in its outer surface and being positionable to engage the groove with the adjacent side face of the link end portion, the improvement comprising a bushing located within and substantially filling the bight of the attaching member and having a face engaging the bail-like portion to receive and transmit loads thereto, said face having a slot therein registerable with said aperture in the attaching member for receiving the link end portion, said bushing also having a transverse bore for receiving the hinge pin therethrough and being formed with resilient means in position relative to said slot to engage the end face of the link end portion and to urge the latter into a position providing misalignment of the link opening and said bore of said bushing, whereby the side faces of the link end portion engage the groove in the surface of the hinge pin and prevent shifting of the hinge pin transversely of the link.

5. In a device for connecting the ends of a belt including an attaching member adapted to be secured to one of the ends of the belt, the attaching member including a pair of spaced parallel legs and a bail-like portion interconnecting the legs, each of the legs having a projection extending toward the other of the legs, the bail-like portion having a longitudinally elongated aperture therein, a connecting link adapted to be secured to the other end of the belt, the connecting link having an end portion extending though the aperture of the attaching member and having an opening therein, and a hinge pin disposable transverse the attaching member and through the opening in the link end portion to provide a detachable pivotal connection between the link end portion and the attaching member, the hinge pin having a groove in its outer surface and being positionable to engage the groove with the adjacent side face of the link portion, the improvement comprising a bushing located within and substantially filling the bight of the attaching member and having a face engaging the bail-like portion to receive and transmit loads thereto, and parts seated against the projections on the legs to main the bushing within the bail-like portion, said face of said bushing having a slot therein registerable with said aperture in the attaching member for receiving the link end portion, said bushing also having a transverse bore for receiving the hinge pin therethrough and being formed with resilient means in position relative to said slot to engage the end face of the link end portion to urge the latter into a position providing misalignment of the link opening and said bore of said bushing, whereby the side faces of the link end portion engage the groove in the surface of the hinge pin and prevent shifting of the hinge pin transversely of the link.

References Cited in the file of this patent
UNITED STATES PATENTS

| | | |
|---|---|---|
| 2,219,399 | Ritzert et al. | Oct. 29, 1940 |
| 2,675,592 | Lofton | Apr. 20, 1954 |
| 2,851,753 | McComb | Sept. 16, 1958 |